US010969935B2

(12) United States Patent
Butcher et al.

(10) Patent No.: US 10,969,935 B2
(45) Date of Patent: Apr. 6, 2021

(54) SYSTEM FOR GENERATION OF NOVEL ARTIFACTS WITH USER-GUIDED DISCOVERY AND NAVIGATION OF THE CREATIVE SPACE

(71) Applicant: Microsoft Technology Licensing, LLC, Redmond, WA (US)

(72) Inventors: Thomas Charles Butcher, Seattle, WA (US); Eric Paul Nichols, Bellevue, WA (US); Mark Fenwick Wheeler, Seattle, WA (US); Ted Tai-Yu Chen, Seattle, WA (US); George Valavanis, Seattle, WA (US); Wesley Hodgson, Seattle, WA (US); Ines Khelifi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 16/003,825

(22) Filed: Jun. 8, 2018

(65) Prior Publication Data

US 2019/0377460 A1 Dec. 12, 2019

(51) Int. Cl.
*G06F 3/048* (2013.01)
*G06F 3/0482* (2013.01)
(Continued)

(52) U.S. Cl.
CPC ......... *G06F 3/0482* (2013.01); *G06N 3/0445* (2013.01); *G06N 3/0454* (2013.01); *G06N 3/088* (2013.01)

(58) Field of Classification Search
CPC ... G06F 3/0482; G06F 3/0445; G06N 3/0454; G06N 3/088
See application file for complete search history.

(56) References Cited

U.S. PATENT DOCUMENTS 6,037,939 A * 3/2000 Kashiwagi ............. G06F 3/038
715/767
7,685,132 B2 * 3/2010 Hyman ................. G06F 16/437
707/999.01
(Continued)

FOREIGN PATENT DOCUMENTS

WO 2017/223560 A1 12/2017

OTHER PUBLICATIONS

Huang, Xun, et al., "Stacked generative adversarial networks", Published on Jul. 1, 2017 pp. 5077-5086 (10 pages total).
(Continued)

*Primary Examiner* — Nicholas Augustine
(74) *Attorney, Agent, or Firm* — Mark K. Young; Mayer & Williams, PC

(57) ABSTRACT

An Artificial Intelligence (AI) driven content generation system is configured to interact with and inject user inputs into the decision-making process to navigate the user through the boundless creative space offered by content generation algorithms powered by AI. A content generation application may generate an initial collection of artifacts (e.g., multimedia) for exposure to a user, which may be generated based on user input, context awareness, or randomly generated. Responsive to user selection of one of the initial artifacts, a subsequent collection of artifacts is generated based on characteristics of the selected artifact. The generative process is recursive in that the generative application and the user continue to interact until the user decides to use one of the generated artifacts. The generative process enables the user to navigate the virtually infinite creative space of artifacts which may be generated by AI algorithms.

20 Claims, 18 Drawing Sheets

(51) Int. Cl.
*G06N 3/04* (2006.01)
*G06N 3/08* (2006.01)
*G06F 3/01* (2006.01)

(56) References Cited

U.S. PATENT DOCUMENTS

| | | | | |
|---|---|---|---|---|
| 8,294,018 | B2* | 10/2012 | Wang | G06F 1/1626 84/615 |
| 8,504,573 | B1* | 8/2013 | Iampietro | G06F 16/907 707/737 |
| 9,754,221 | B1 | 9/2017 | Nagaraja | |
| 2004/0268413 | A1* | 12/2004 | Reid | H04N 21/4532 725/131 |
| 2005/0183041 | A1* | 8/2005 | Chiu | G06F 3/04815 715/850 |
| 2005/0195159 | A1* | 9/2005 | Hunleth | H04N 21/4532 345/156 |
| 2007/0033220 | A1* | 2/2007 | Drucker | G06F 16/48 |
| 2008/0005067 | A1 | 1/2008 | Dumais et al. | |
| 2008/0091771 | A1* | 4/2008 | Allen | H04L 67/1095 709/203 |
| 2008/0182563 | A1* | 7/2008 | Wugofski | G06Q 30/02 455/414.2 |
| 2008/0183678 | A1* | 7/2008 | Weston | G06F 16/335 |
| 2009/0150775 | A1* | 6/2009 | Miyazaki | G06F 3/0482 715/702 |
| 2010/0310135 | A1* | 12/2010 | Nagaoka | G06K 9/00677 382/118 |
| 2016/0364266 | A1 | 12/2016 | Bastide et al. | |
| 2017/0364588 | A1 | 12/2017 | Bastide et al. | |
| 2017/0374374 | A1 | 12/2017 | Wang et al. | |

OTHER PUBLICATIONS

Rosca, M., et al., "Variational Approaches for Auto-Encoding Generative Adversarial Networks", Published on Jun. 15, 2017 pp. 1-21 (21 pages total).

Nguyen, A., et al., "Plug & Play Generative Networks: Conditional Iterative Generation of Images in Latent Space", Published in Jul. 2017, pp. 4467-4477 (11 pages total).

Wang et al., "Generative Image Modeling using Style and Structure Adversarial Networks", Robotics Institute, Carnegie Mellon University, Published on Oct. 8, 2016, pp. 1-22 (22 pages total).

Maguitman, Ana, "Searching in the Context of a Task: A Review of Methods and Tools", In CLEI Electronic Journal, vol. 21, No. 1, Paper 1, Apr. 4, 2018, 26 Pages.

"International Search Report and Written Opinion Issued in PCT Application No. PCT/US2019/036195", dated Aug. 21, 2019, 18 Pages.

* cited by examiner

200

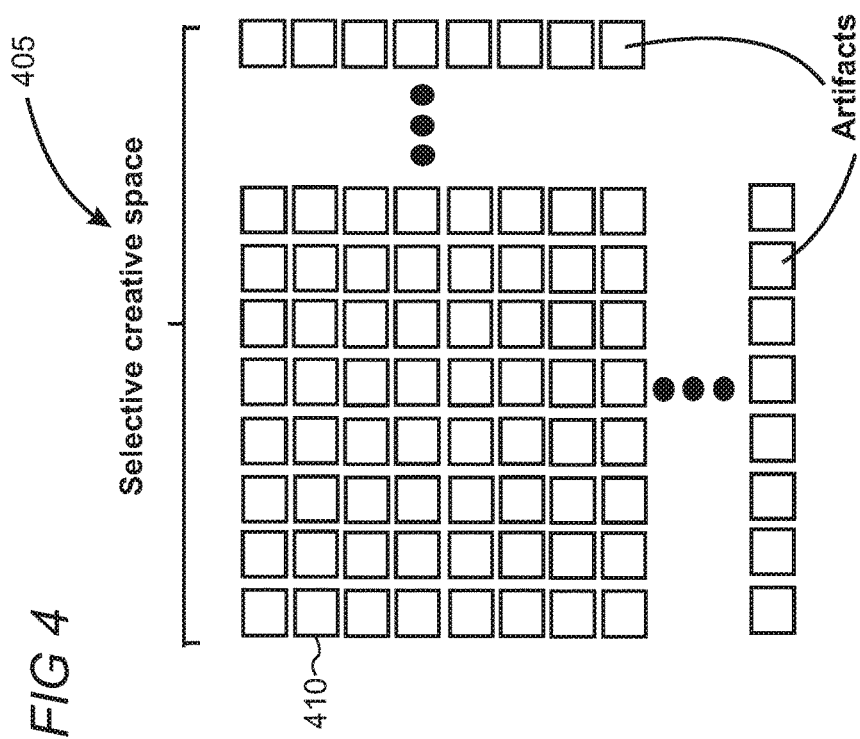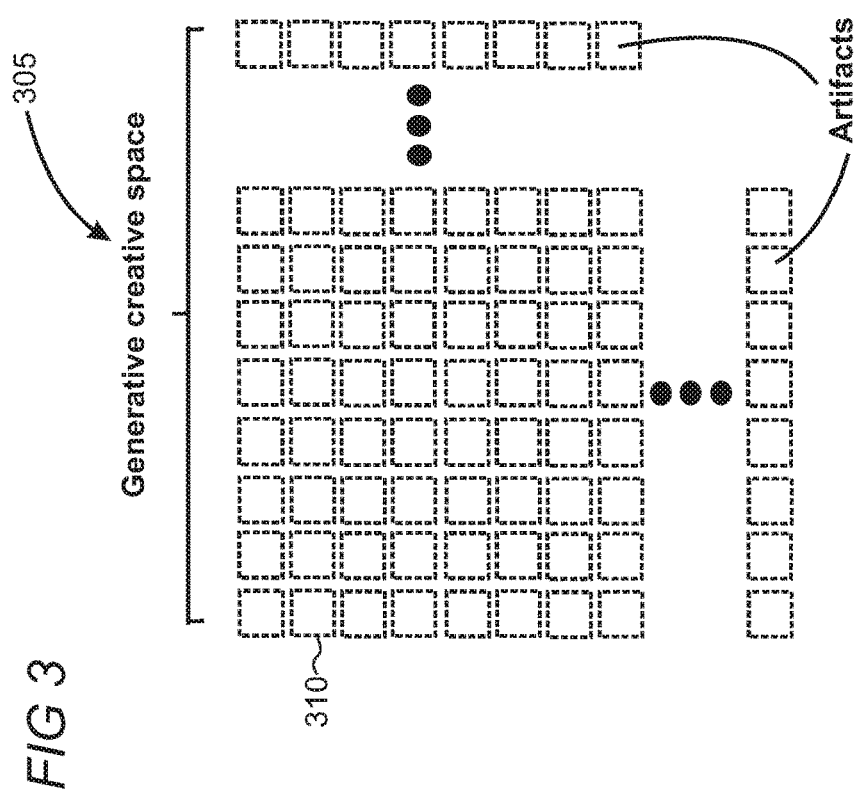

800

1700

1800

SYSTEM FOR GENERATION OF NOVEL ARTIFACTS WITH USER-GUIDED DISCOVERY AND NAVIGATION OF THE CREATIVE SPACE

BACKGROUND

Artificial Intelligence (AI) content generation systems may be configured to provide a user with artifacts of content responsively to a user request. The user may select a dataset of source examples (e.g., a list of images of people's faces), to which the AI system responsively generates a large set of related results (e.g., generated faces) based on characteristics of the source examples. The number of results which the AI system can generate can be virtually infinite. During the content generation process the AI system may focus on characteristics of the source examples which are uninteresting to the user, and thereby provide less satisfactory results. Furthermore, the user may want additional input into the content generation process.

SUMMARY

An Artificial Intelligence (AI) content generation application configured to recursively generate artifacts responsively to user input is implemented to facilitate machine-user interaction in navigating a creative space. An artifact may be a dataset that can be exposed to and consumed by the user through a user interface, including but not limited to multimedia such as an image, video, sound, music, and the like. Using the content generation application, a computing device generates a collection of artifacts for presentation to a user in response to a user request. The user can select one of the presented artifacts to which the computing device responsively generates a subsequent collection of artifacts based on characteristics of the selected artifact. The process is recursive so that the computing device generates, organizes, and presents a collection of artifacts to the user based on a previously-selected artifact. The subsequently generated artifacts may be a relatively narrower subset of artifacts which are focused on characteristics of the selected artifact. The recursive process directs the content generation application in a creative direction desirable to the user, provides user control over the process, and guides the user through the creative space in a tailored fashion.

The user initially navigates an application that may be installed locally on the user's computing device or may be hosted by a remote server which the user accesses through a local web browser. The user inputs an initial request for an artifact into the computing device. In response to the initial artifact request, the content generation application produces a collection of initial artifacts for presentation or exposure to the user. The initial artifact production may be based on user inputs (e.g., the user can enter an emotion or preferred genre), context awareness maintained by the computing device (e.g., date, time, and/or season), or be randomly generated. The production of the artifacts may be performed using AI and machine-learning algorithms, such as a Generative Adversarial Network (GAN) or Attentional GAN (AttnGAN).

Instead of restricting the user's options to only those that are provided in the initial collection of artifacts, the content generation application is configured to receive a user selection of an artifact and responsively produce subsequent collections of artifacts. The generative process is recursive to guide the user through the potentially infinite possibilities of the creative space.

One or more parameters may be automatically generated based on the generated artifacts and/or can be selected by the user. The parameters can facilitate navigation through the creative space and can supplement the generation of artifacts to fine-tune the results. The parameters may be human understandable concepts so that the user can appreciate and comprehend the application of the parameters to the presented collection of artifacts. The parameters may be hyperparameters which can reduce a multi-dimensional concept into two-dimensions as organized and presented to the user in a grid-form (e.g., N×M) on the user interface. For example, a term like "energy" can have many different facets when applied to music, such as tempo, key, and number of notes. In an embodiment in which energy is the parameter, the collection of music-artifacts can be organized so that they are presented on the user interface, for example, along a spectrum between high energy and low energy.

Values of a single parameter or multiple parameters may be applied to each artifact in the collection, for example, using the x and y axes of the displayed collection. In an illustrative embodiment, a collection of artifacts related to an avatar character may be presented to the user in which one of the parameters is the color red. When the collection of artifacts is presented to the user in the grid-form, the red parameter may be assigned to an x or y axis of the collection. The value of the red parameter applies to and affects each artifact of the presented results, for example, by organizing the avatars in a way that shows respectively more or less of the color red or darker or lighter applications of the color red, among other renditions.

The user's selection of an avatar having a dark red application may cause the content generation application to generate a subsequent collection of artifacts with additional dark red examples so the user can select the artifact having a desired shade of red. A selection of a light red avatar may result in presentation of a subsequent collection of artifacts that includes additional light red examples.

Advantageously, the content generation application injects user input into the AI decision-making process to enhance user-machine interaction and improve efficiency of user navigation through the potentially infinite number of artifacts in the creative space. The user benefits by being presented with desirable content, for example, through a more efficient human-machine interface. Utilization of processing resources by the computing device on which the content generation application executes may be reduced because the content generation application generates tailored results for the user in kind and degree. For example, the recursive generation process uses characteristics or parameter values associated with the user's selected artifact to thereby generate results that are tailored to those characteristics or parameter values. Subsequently generated artifacts may be restricted to a continuum of examples based on the value of the one or more parameters as applied to the selected artifact. The computing device thereby saves battery power, processing power, and memory by expediting the processing tasks and shortening the number of operations for its processor to execute. When the content generation application is accessed remotely over a network, bandwidth is saved by reducing the number of operations and data transmissions between the user's computing device and the remote server.

A unique user interface is provided to the user by displaying an easily understandable collection of artifacts in grid-form which, upon artifact selection by the user, responsively presents additional artifacts to the user. The presentation of artifacts provides a user-accessible and controllable window into the AI driven content generation application and its associated processes. The utilization of parameters along x and y axes of the presented artifacts provides a medium which bridges the communication gap between human and machine to thereby optimize the user's interaction with the application and streamline the content generation process.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 3 shows an illustrative diagram for a generative creative space;

FIG. 4 shows an illustrative diagram for a selective creative space;

Like reference numerals indicate like elements in the drawings. Elements are not drawn to scale unless otherwise indicated.

DETAILED DESCRIPTION

Figure 1:
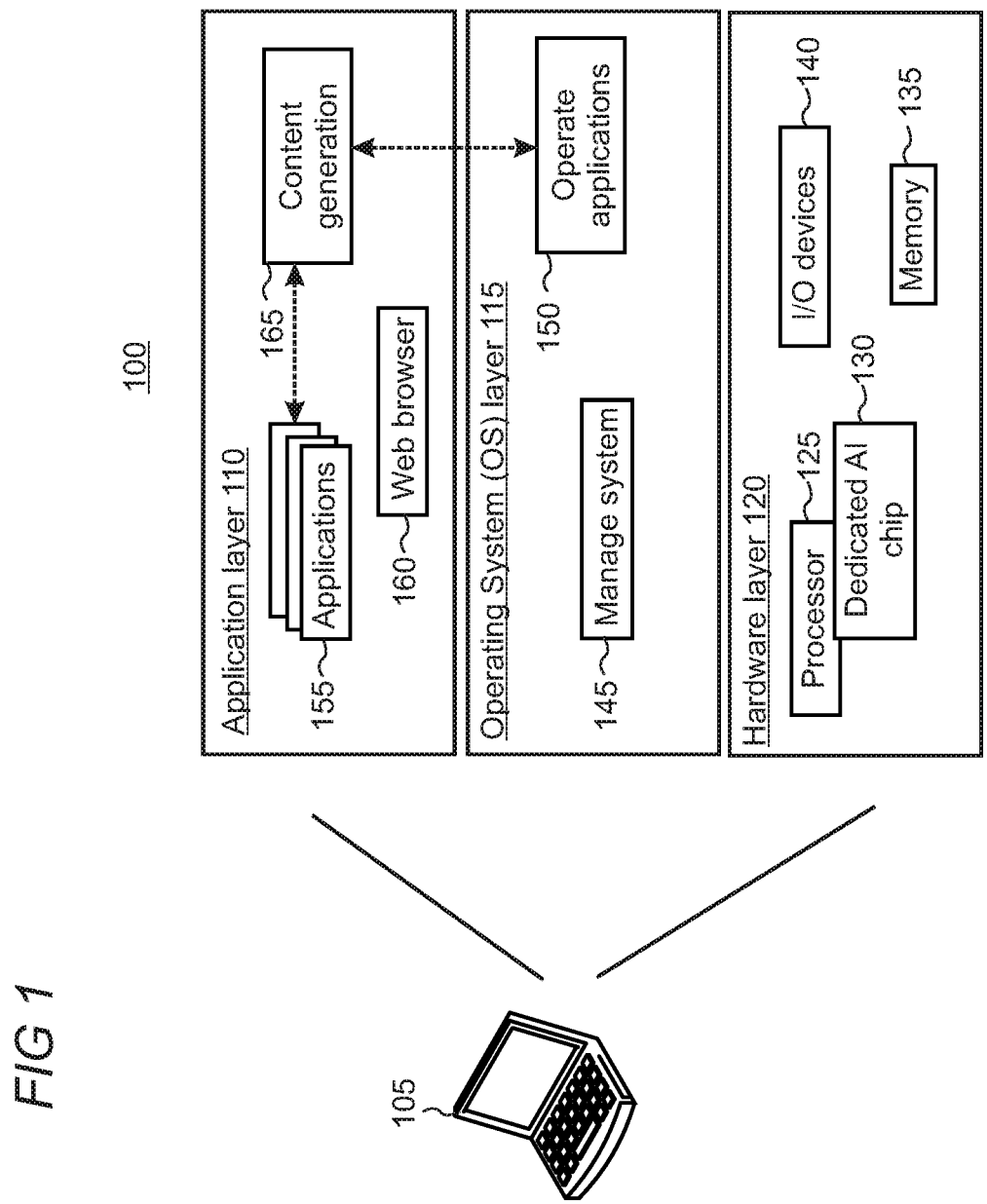
FIG. 1 shows an illustrative architecture of a user's computing device.

FIG. 1 shows an illustrative system architecture 100 for a computing device 105. The architecture is arranged in layers and includes a hardware layer 120, an operating system (OS) layer 115, and an application layer 110. The hardware layer 120 provides an abstraction of the various hardware used by the computing device 105 to the layers above it. In this illustrative example, the hardware layer supports one or more processors 125, a dedicated AI chip 130, memory 135, and input/output devices 140. The dedicated AI chip may be configured to handle neural network computing and machine-learning tasks to offload from and accelerate some of the processing by the conventional central processing unit (CPU). The AI chip, however, is not necessary to implement the features described herein. The I/O devices can include a user interface and a keyboard, display, touchscreen display, speaker, microphone, etc. (not shown). As discussed in further detail below, the I/O devices provide the mechanism for user-machine interaction during the recursive generation of artifacts.

The application layer 110, in this illustrative example, supports various applications 155 including a web browser 160 and a content generation application 165. Any number of applications can be utilized by the computing device 105, whether proprietary or third-party applications. The applications can be implemented using locally executing code. However, in some cases, applications can rely on services and/or remote code execution provided by remote servers or other computing platforms. The web browser may provide the user access to websites or services offered by other nodes of the network such as a remote server. The content generation application may be configured to produce, through generation or selection, collections of artifacts for exposure to a user.

Figure 2:
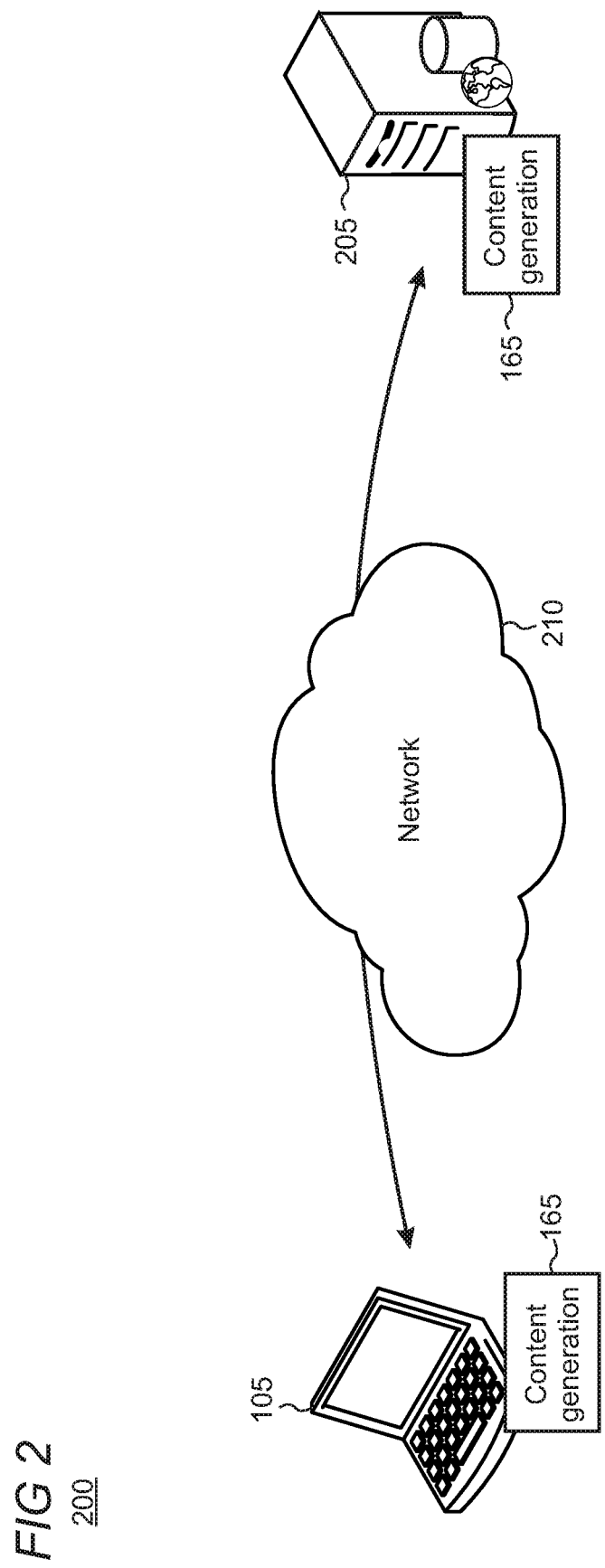
FIG. 2 shows an illustrative environment in which the computing device communicates with a remote server.

FIG. 2 shows an illustrative environment 200 in which the content generation application 165 may operate local to the computing device 105, remotely at a remote server 205, or a combination of both devices. The remote server's content generation application may be accessible via the computing device's web browser or through extensibility from the local computing device's content generation application. The computing device and remote server may communicate over a network 210 which can include a local area network, wide area network, the Internet, and the world wide web. The content generation application may function as a standalone application, provide extensibility to distinct first- or third-party applications as illustratively shown in FIG. 1 by the arrow connecting the applications, or function as a feature on a first- or third-party application installed on the computing device. For example, a video-editing application may include features for AI content generation. Discussion herein with reference to the content generation application may be with reference to a dedicated application or extensibility to or as features included in a distinct application's API (application programming interface).

The OS layer 115 depicted in FIG. 1 supports, among other operations, managing the operating system 145 and operating applications 150 as illustratively shown by the arrow. The OS layer may interoperate with the application and hardware layers to facilitate execution of programs and perform various functions and features.

FIG. 3 shows an illustrative generative creative space 305 for which the content generation application facilitates user navigation. The generative creative space conceptually illustrates the virtually infinite possibility of artifacts which the content generation system can generate through machine learning and artificial intelligence algorithms. Artifacts 310 can include a dataset which is consumable by a user, including multimedia such as sound, music, image, video, and the like, and can include various file types such as mp3, mp4, jpg, etc.

The generative process can use Generative Adversarial Network (GAN) or Attentional GAN (AttnGAN) which utilizes two neural networks, a generator and a discriminator, to generate a multimedia, such as an image. The AttnGAN process may be iteratively applied to characteristics to improve results, such as recognizing individual words (e.g., a color or object) in a user input.

Deep learning techniques can also be utilized to generate sounds or music such as by converting sounds to a digital representation that is suitable for neural network input, training the network weights using these input sounds, and then generating sounds based on new user-specified inputs to the network. Long short-term memory (LSTM) can be utilized as a tool to learn sequential properties of uploaded datasets and configured for learning long-term dependencies within temporal sequences, thereby enabling the prediction and generation of sounds. Other machine-learning techniques known in the art can be utilized to facilitate artifact generation as used herein.

FIG. 4 shows an illustrative selective creative space 405 in which the content generation application can facilitate user navigation. Although the disclosure herein may reference the generative creative space 305, the selective creative space illustrates the magnitude of pre-existing artifacts. Artifacts 410 represent pre-existing datasets or multimedia, while the artifacts 310 may be machine-generated. Any discussion herein with reference to generating artifacts for the generative creative space may likewise apply to selecting artifacts from the selective creative space. Generating and selecting artifacts can be generically referred to as producing artifacts.

Figure 5:
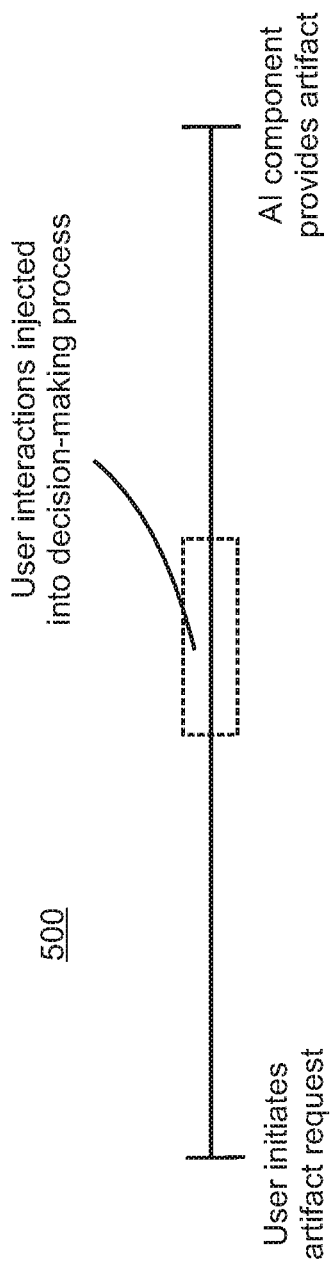
FIG. 5 shows an illustrative diagram in which user interactions are utilized to generate artifacts.

FIG. 5 shows an illustrative diagram 500 in which user interactions are injected into the decision-making process performed by the content generation application 165. The user may initiate a request for an artifact from the content generation application. Instead of the application solely providing the user with an artifact as illustratively represented on the other end of the timeline in FIG. 5, the application is configured to interact with the user. The implementation to receive user input in the application facilitates the generation of fine-tuned results and provides the user with creative freedom during the artifact generation process.

Figure 6:
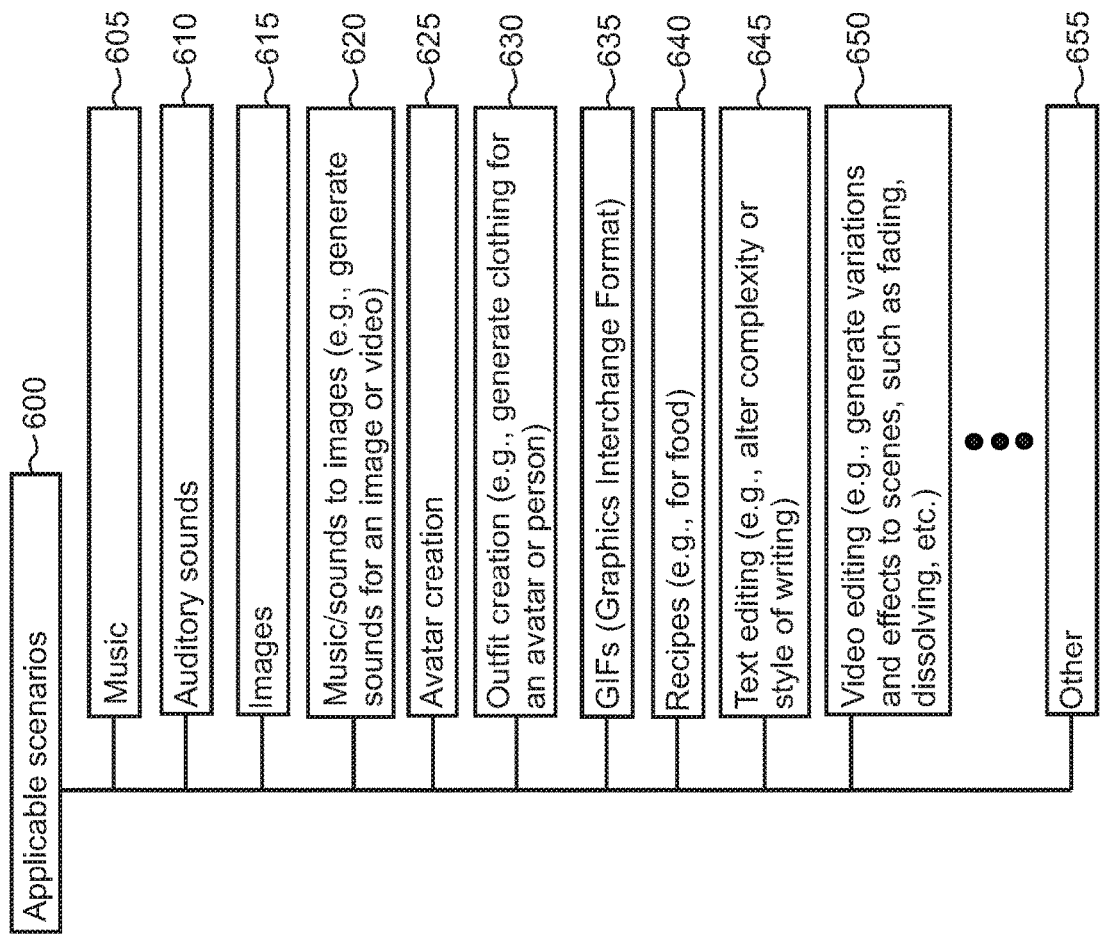
FIG. 6 shows an illustrative taxonomy of applicable scenarios to generate and provide artifacts to a user.

FIG. 6 shows an illustrative taxonomy of applicable scenarios 600 for which the content generation application can apply. The non-exhaustive applicable scenarios can include music 605, auditory sounds 610, images 615, music/sounds to images (e.g., generate sounds for an image or video) 620, avatar creation 625, outfit creation (e.g., generate clothing for an avatar or actor) 630, GIFs (Graphics Interchange Format) 635, recipes (e.g., for food) 640, text editing (e.g., alter complexity or style of writing) 645, video editing (e.g., generate variations and effects to scenes, such as fading, dissolving, etc.) 650, and other applications 655.

Figure 7:
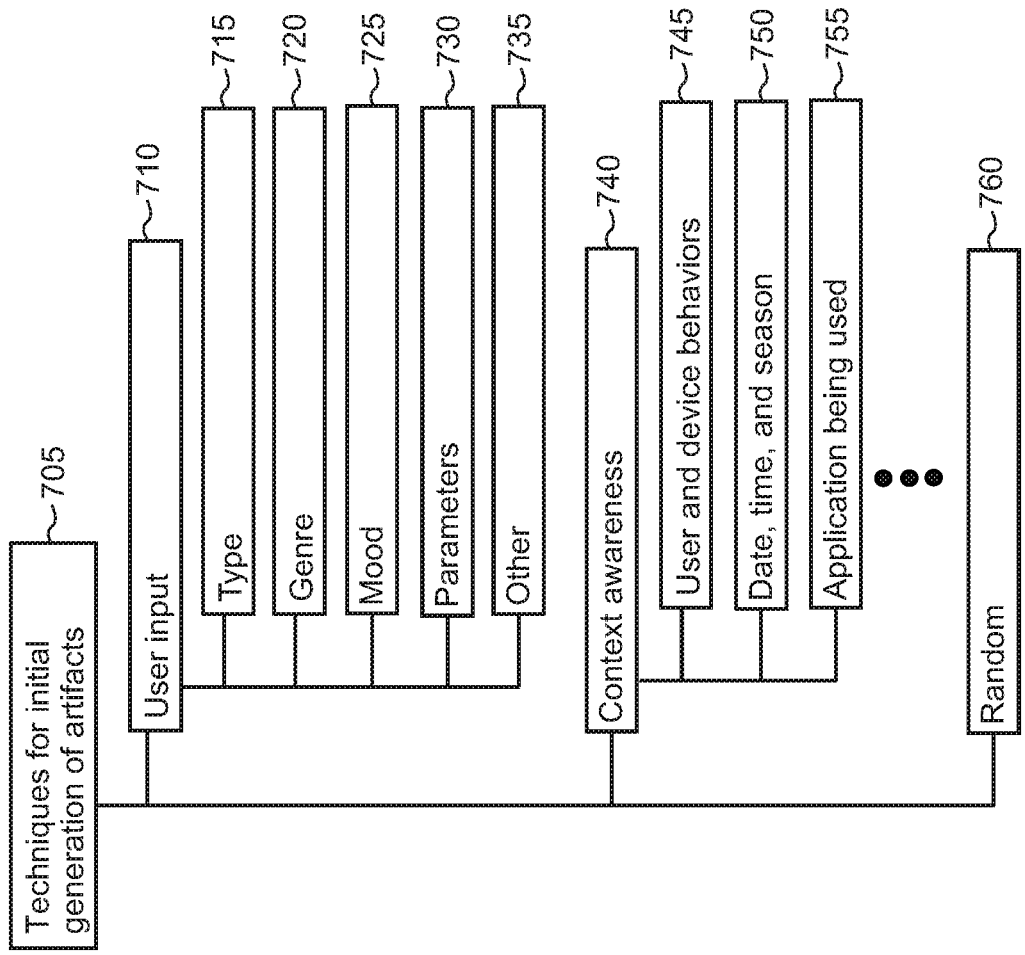
FIG. 7 shows an illustrative taxonomy of techniques for initial generation of the artifacts.

The content generation application may generate an initial collection of artifacts responsive to a user input or request. FIG. 7 shows an illustrative taxonomy of techniques for initial generation of artifacts 705. User input 710 can be utilized by the content generation application as a basis for the generated content in the artifacts. User input can include any one or more of type (e.g., music, image, video, etc.) 715, genre 720, emotion or mood 725, parameters (e.g., characteristics or guidelines for the generated artifacts) 730, or other input 735. Other techniques for the initial generation of artifacts include context awareness 740 which can be based on any one or more of user and device behaviors 745, date, time, and/or season 750, or the application being used (e.g., generate an image for a photo application) 755. The initial artifacts may be a random 760 generation by the content generation application as well.

Figure 8:
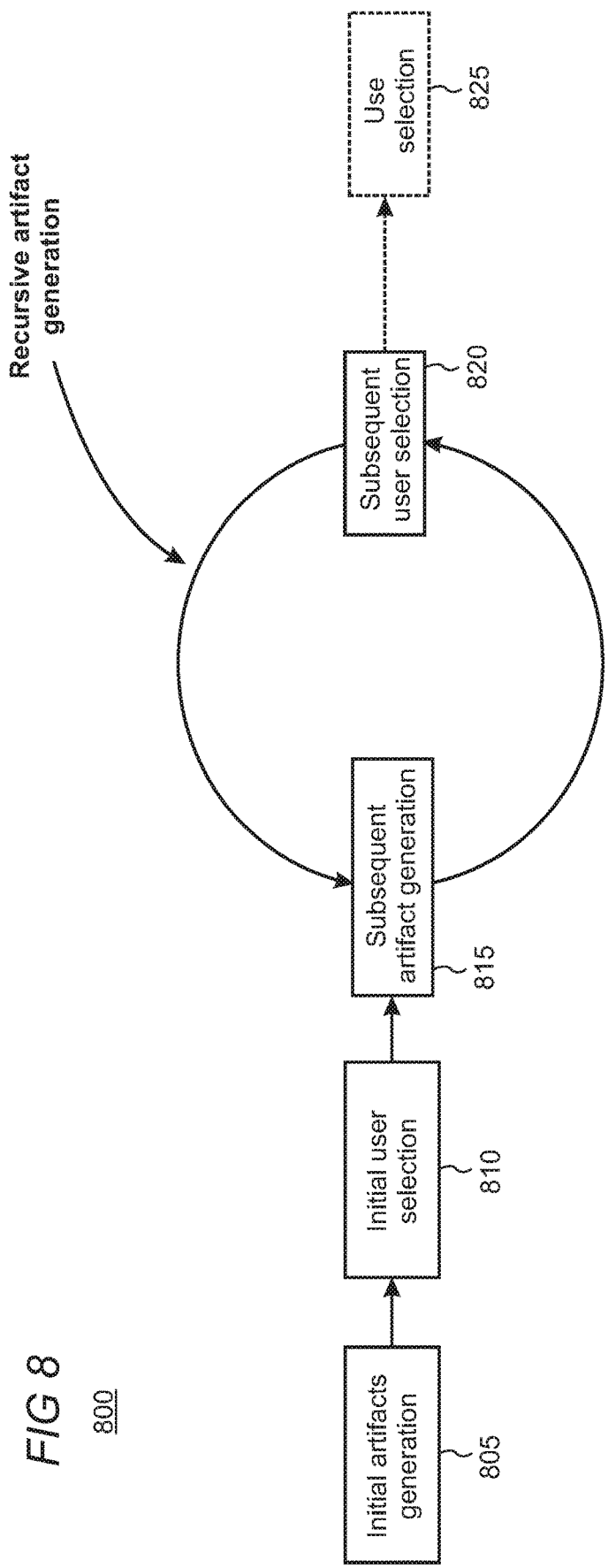
FIG. 8 shows an illustrative flowchart performed by one or both of the computing device or the remote server.

FIG. 8 shows an illustrative flowchart 800 which conceptualizes the workflow of the content generation application. In step 805 an initial collection of artifacts is generated responsive to a user request or input (FIG. 7). In step 810 the user makes an initial selection of an artifact from the initial collection of artifacts generated. In step 815 a subsequent collection of artifacts is generated based on the user's selection from the initial collection of artifacts. Unique characteristics or parameter values as applied to the selected artifact are exploited for generation of the subsequent collection of artifacts. In step 820 the user makes another selection from the subsequent collection of artifacts. The processes in steps 815 and 820 are recursive so that the user and computing device can communicate, interact, and ultimately tailor generated collections of artifacts until the user decides to use a particular selection as shown in step 825.

Figure 9:
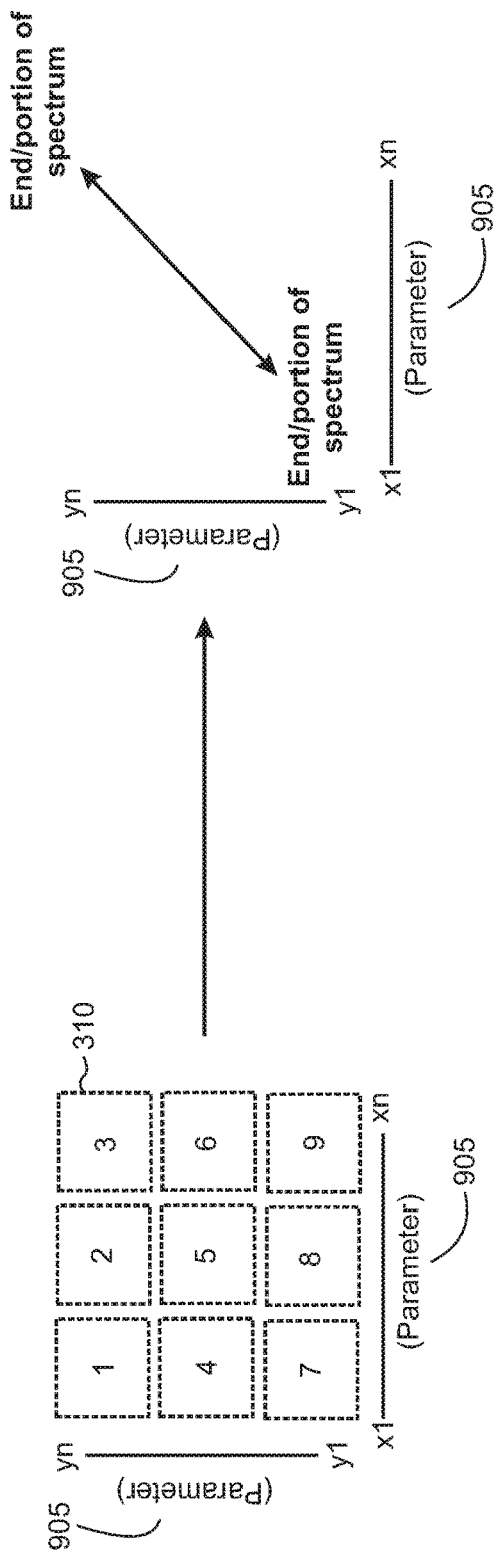
FIG. 9 shows an illustrative diagram of the application of parameters to a set of provided artifacts.

FIG. 9 shows an illustrative diagram in which artifacts are organized and presented according to parameters 905. The parameters may be applied along an x and y axis of the presented artifacts, which in this example are graphically organized and presented in grid-form to the user. Each artifact has a different value with respect to the one or more parameters which are applied to the collection. The artifacts are generated, organized, and presented according to a spectrum for each respective parameter to provide the user with an assortment of options.

Figure 10:
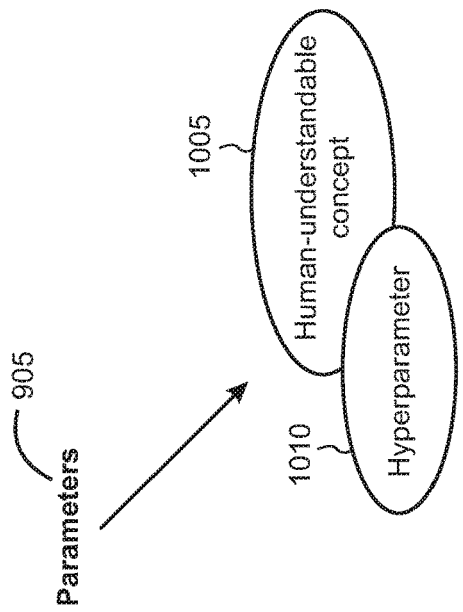
FIG. 10 shows an illustrative environment in which an applied parameter is in the form of a human-understandable concept.

FIG. 10 illustratively shows that the parameters can be human-understandable concepts 1005 which can facilitate the user's understanding of the presented artifacts within the spectrum defined by the parameters. Exemplary human-understandable concepts can include specific colors (e.g., red or purple), tempo, emotion (e.g., anger, happiness), density, energy, etc. (not shown). In an alternative embodiment the parameters may not be human-understandable concepts, but rather can be presented in a format which is more machine-understandable.

The parameters may be considered hyperparameters 1010 in which a multi-dimensional concept is mapped into two dimensions. For example, emotions can have a variety of meanings such as happiness, sadness, anger, contempt, etc., and two-dimensional reduction techniques can be utilized to organize and present this array of emotions in two-dimensional and comprehensible form. Other examples of a hyperparameter application can include density or energy as applied to a given set of artifacts. For example, a high end of a spectrum using energy as the parameter when applied to music can include high tempo and Pop music, whereas a low end of the spectrum can include slow tempo and melancholy music.

Figure 11:
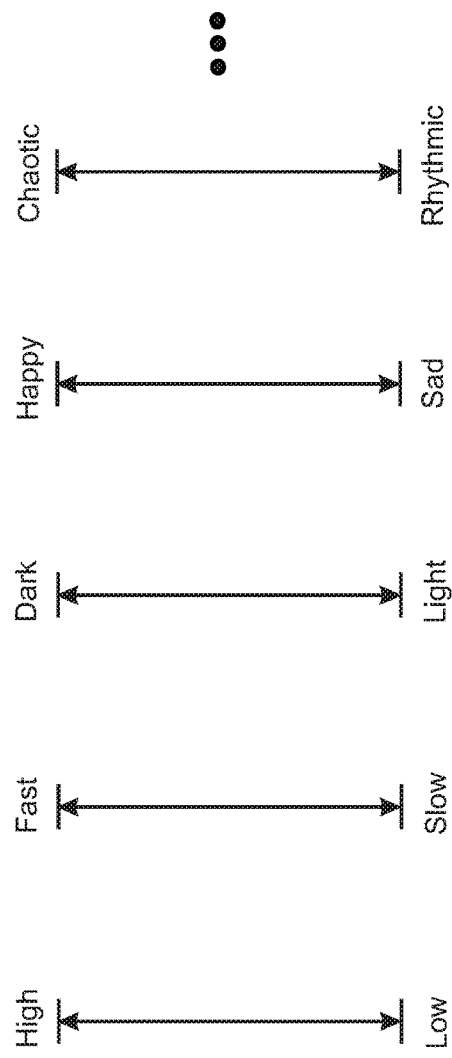
FIG. 11 shows illustrative examples of ranges for parameters as applied to the artifacts.

FIG. 11 illustratively shows opposing ends of a spectrum which may be applied for various parameters or hyperparameters, which are not defined in the examples. As the artifacts are generated, organized, and presented to the user in grid-form as shown in FIG. 9, the placement and organization of the uniquely generated artifact within the presentation may gradually adjust toward an end or portion of the spectrum according to the exemplary extremes shown in FIG. 11. The value of the parameter as applied to each presented artifact comports to the artifact's placement within the presentation. Generation, organization, and presentation of the artifacts are therefore performed according to a continuum of values of the parameters to the artifacts.

If a generative neural net technique such as a generative adversarial network (GAN) or Variational autoencoder (VAE) is used to generate the artifacts, then this generative process can be supplemented with additional parameters to further control the artifact generation. This naturally allows the user to select several parameters (e.g., two parameters for a N×M grid, or three parameters for a 3D N*M*P display cube, etc.) and feed in these parameters during generation, varying each parameter to cover the generative space. This technique can be improved if the output from the creative space is labeled, in which the parameters were deduced by human inspection (e.g., "excitement" and "happiness" levels for a given chunk of music labeled by humans). Labelling the generative output, however, is not necessary to use the parameters.

The content generation application may be further configured to automatically adjust or receive user input to alter the parameters during the generative process based on the user's selections. For example, if there is overlap among parameters or the user's selection guides the application to another characteristic within the creative space, then the parameters may adjust and be updated accordingly. The user may also elect to change parameters mid-process.

In an embodiment, a domain-specific analysis of the output can be conducted and the desired parameters computed algorithmically. The random outputs from the generative algorithm can be organized into the desired grid output based on the computed parameters.

Figure 12:
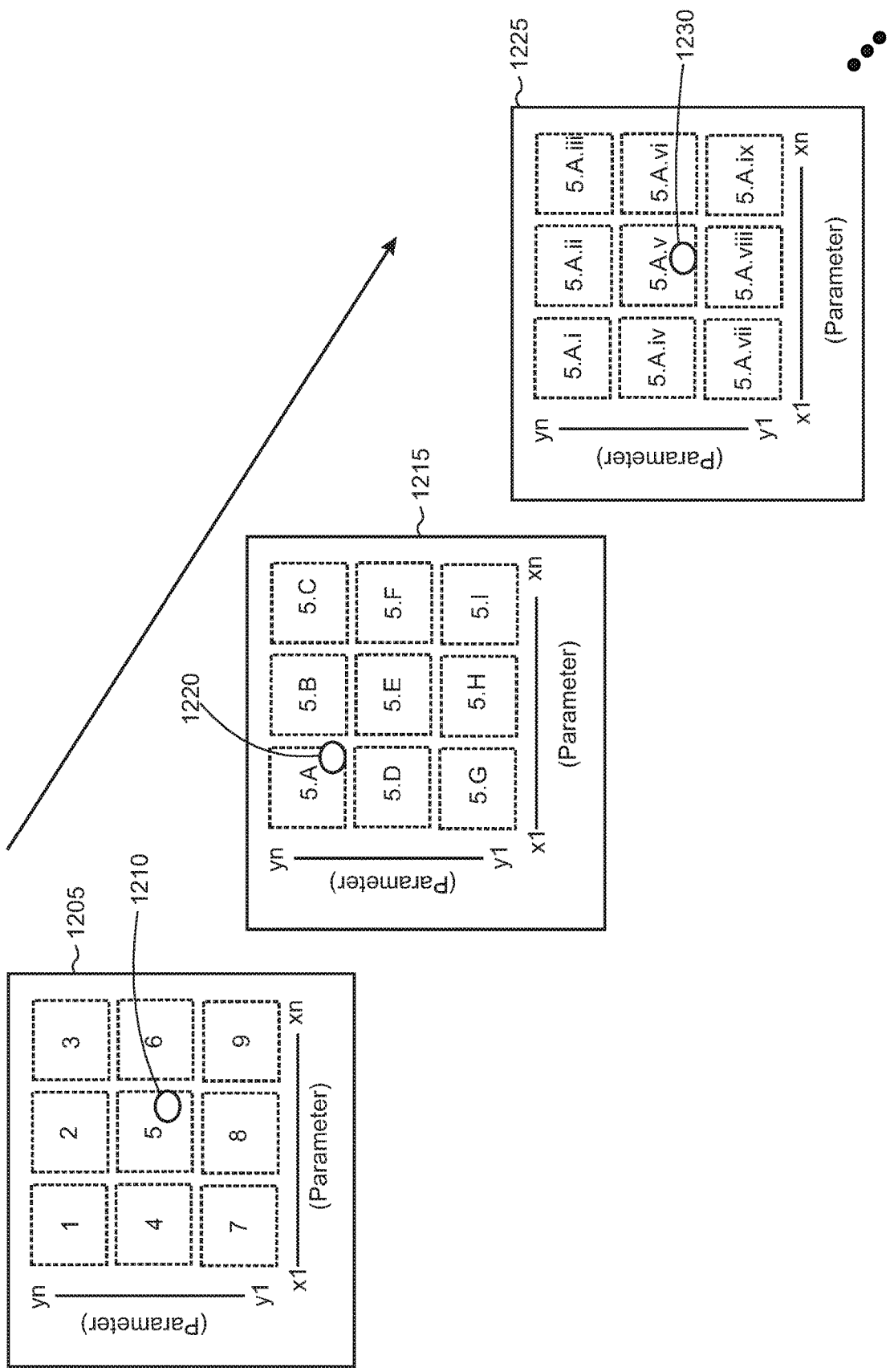
FIGS. 12-14 show illustrative environments in which artifacts are recursively generated responsive to user selections.

FIG. 12 shows an illustrative implementation of recursive artifact generation in which the user selects specific artifacts and the computing device generates subsequent collections of artifacts based on the user's selection. An N×M grid (alternatively an N-element line, or an N×M×P cube) is utilized in which the generated examples are displayed. Although examples are provided with respect to a two-dimensional grid, three-dimensional or other multi-dimensional models may also be implemented which can utilize additional parameters for fine-tuned artifact generation. The user's selection within the grid indicates a parameter value that the user may like. More parameters near this choice are emphasized in the next generative round, where another set of examples are generated and organized into the grid. This process continues and the parameters (i.e., grid points) that the user picks are continually fed back into the generative system.

The user selects artifact 5 from the initial rendition of artifacts 1205 as illustratively shown from input 1210. The computing device responsively generates a subsequent collection of artifacts 1215 which are a sub-set of the selected artifact 5. Responsive to the user's input selection 1220, the computing device generates a subsequent collection of artifacts 1225 which are a subset of the selected artifact 5.A. The user's input selection 1230 may cause the computing device to generate another collection of artifacts or alternatively the user may choose to use the artifact 5.A.v.

Figure 13:
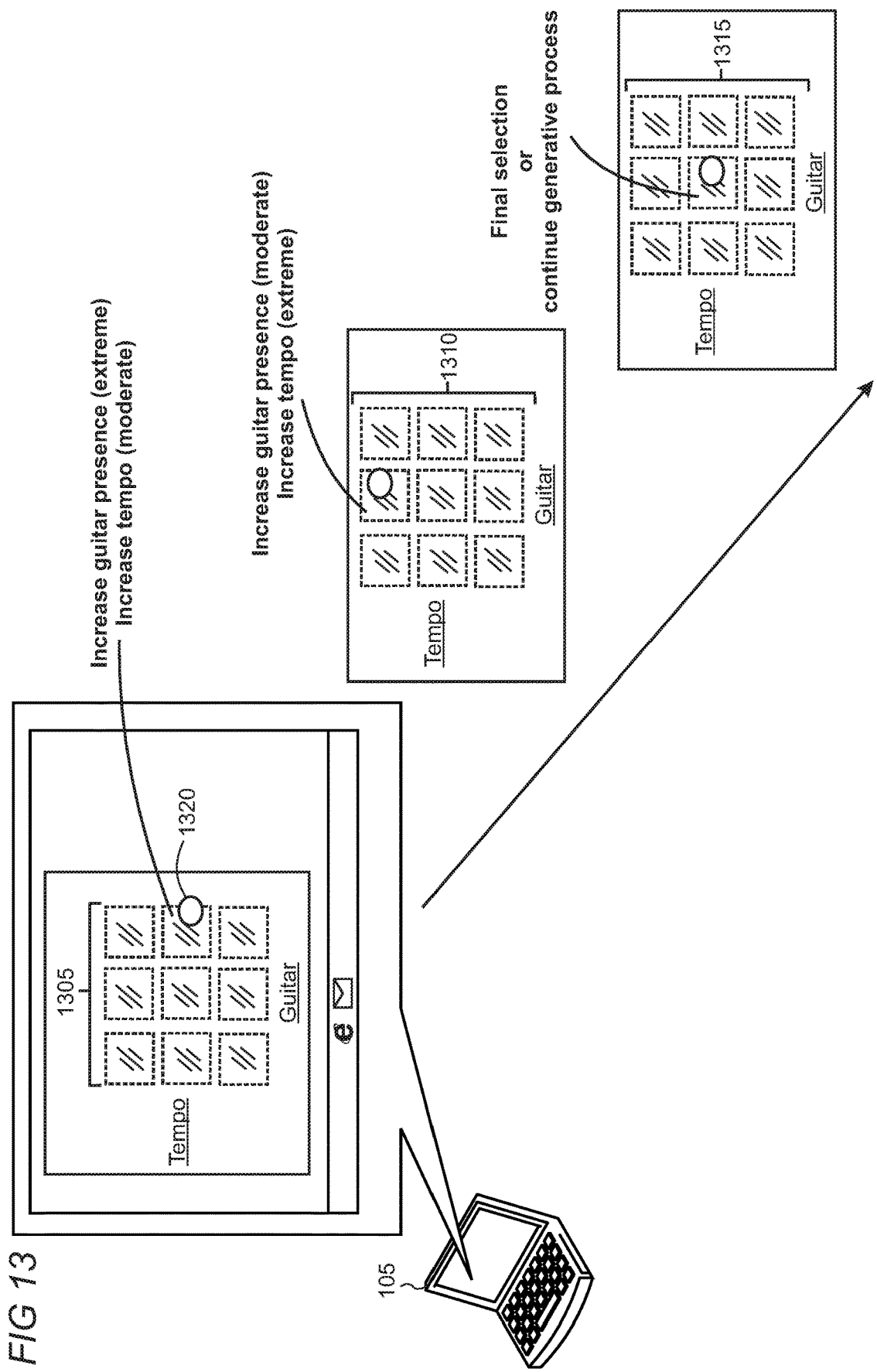

FIG. 13 shows an illustrative real-world implementation of recursive artifact generation for music in which the parameters are tempo and guitar, respectively, along y and x axes. As illustratively shown upon each user selection 1320, the selected artifact contains characteristics or values along the spectrum (FIGS. 9 and 11) according to the parameters. Each generation of artifacts is a subset of or is generated based on the characteristics or parameter values of the previously selected artifact. The first artifact selected in the first rendition of artifacts 1305 indicates the user wants more examples with an extreme increased presence of guitar and a moderate increase in tempo. The second artifact selected in the second rendition of artifacts 1310 indicates the user wants more examples with a moderate increased presence of guitar and an extreme increase in tempo. This process continues for the third rendition of artifacts 1315, in which the user's selection can be used by the computing device to generate subsequent sets of artifacts or the user can use the selection.

Figure 14:
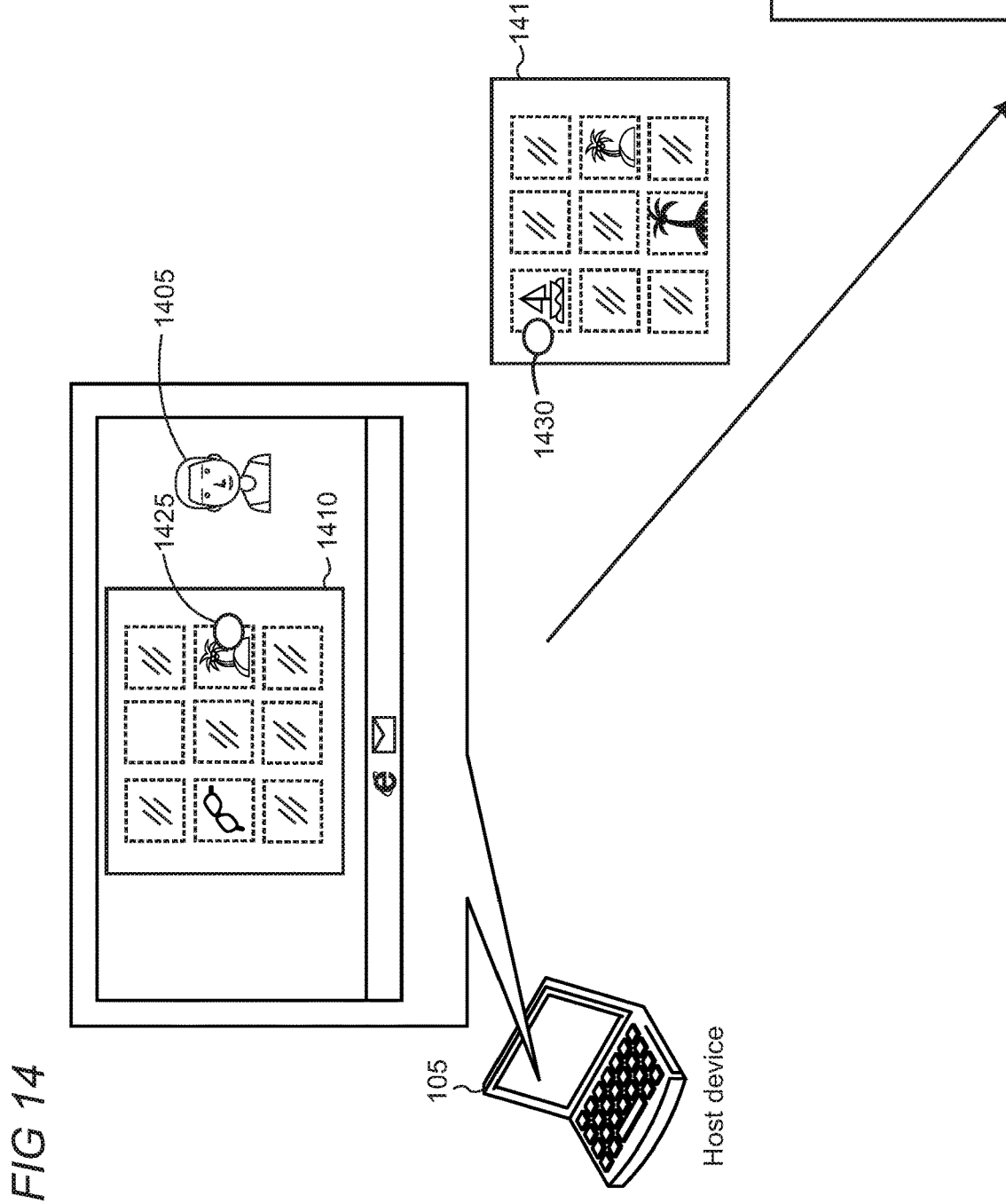

FIG. 14 shows an illustrative real-world implementation of recursive artifact generation for designs for an avatar's 1405 shirt. While designing the user's personal avatar he may want to use an AI content generation application to generate and present designs. Although there are no parameters shown in this example, parameters may be automatically generated or selected by the user to fine-tune the generation, organization, and presentation of artifacts as discussed above.

The first rendition of artifacts 1410 may be initially created based on user input, context awareness, or randomly generated (FIG. 7). As illustratively shown, the user selects 1425 an image-artifact that portrays a palm tree on a beach. The generative process may recognize the user wants to be presented with other images which are related to outdoors, the beach, or trees.

The subsequently generated rendition of artifacts 1415 thereby portrays a new collection of artifacts based on the previous user selection. The subsequent collection may be based on characteristics of the selected image, such as the beach, palm trees, summertime, or other associations of or objects in the selected image, or the value of a parameter to the selected image. The user's next selection 1430 causes the computing device to generate another rendition of artifacts 1420 based on characteristics of or the value of parameters applied to the selected image. The user's selection 1430 includes a sailboat and the ocean which can indicate the user wants additional images generated which pertain to the ocean, beach, summertime, etc. As shown in the subsequent rendition of artifacts 1420 surfboards are presented to the user as one image. The recursive process continues until the user finalizes his selection.

Figure 15:
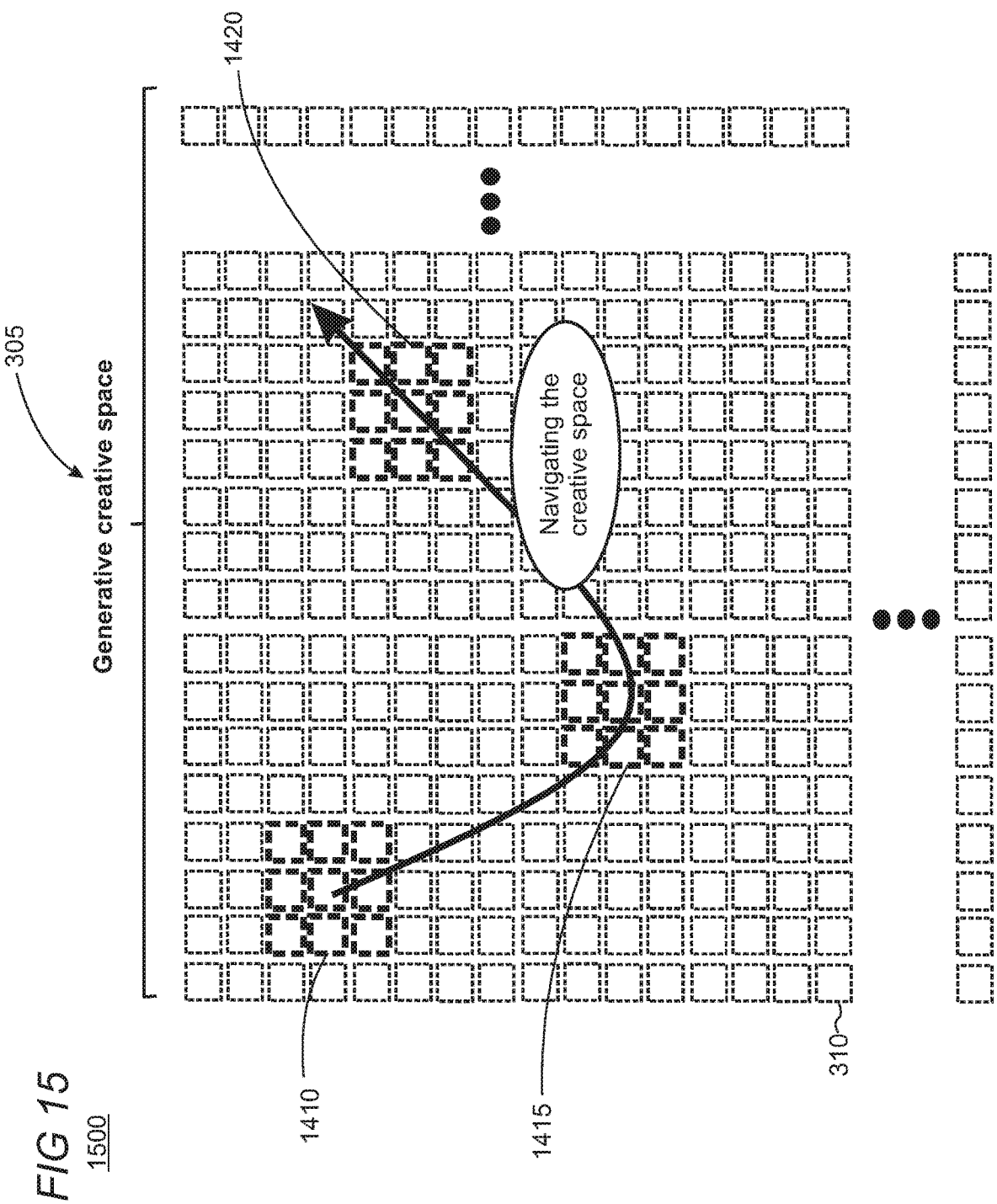
FIG. 15 shows an illustrative environment in which the recursive generation of artifacts navigates the user through the creative space.

FIG. 15 shows an illustrative high-level diagram in which the AI content generation application navigates the user through the generative creative space 305 of artifacts 310. The machine-user interaction of FIG. 14 is graphically depicted in the generative creative space. Instead of the user having to view each artifact that could be generated by AI generative algorithms, the user and machine interactions deliver tailored results and a streamlined navigation through the generative creative space. The artifacts presented to the user are a segment of the generative creative space. FIG. 15 may likewise apply to the embodiment depicted in FIG. 13 and to the selective creative space 405 depicted in FIG. 4.

Figure 16:
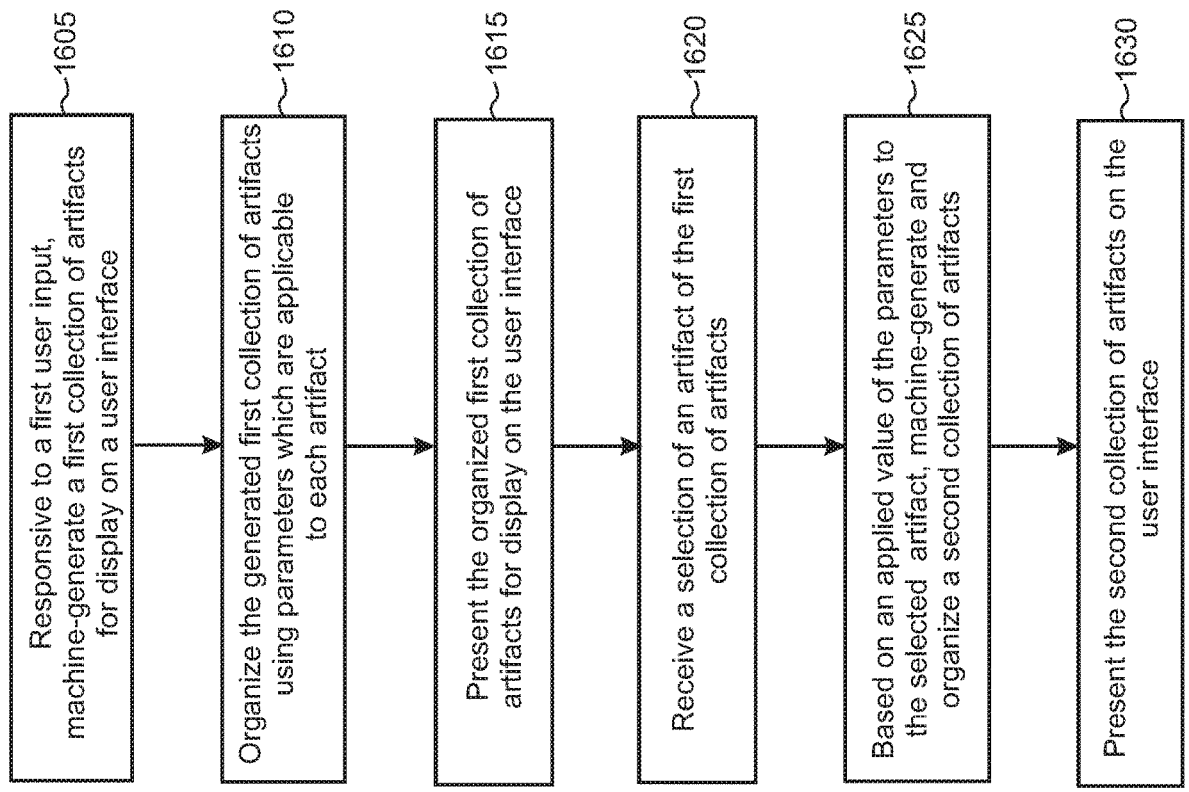
FIGS. 16-18 show illustrative processes performed by one or both of the computing device or the remote server.

FIG. 16 is a flowchart of an illustrative method 1600 in which a local computing device, remote server, or a combination of the two can perform. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1605, responsive to a first user input, a first collection of artifacts is machine-generated for display on a user interface. In step 1610, the generated first collection of artifacts is organized using one or more parameters applied to each artifact. In step 1615, the organized first collection of artifacts is presented for display on the user interface. In step 1620, a selection of an artifact of the first collection of artifacts is received. In step 1625, based on an applied value for each of the one or more parameters to the selected artifact, a second collection of artifacts is machine-generated and organized. In step 1630 the second collection of artifacts is presented on the user interface.

Figure 17:
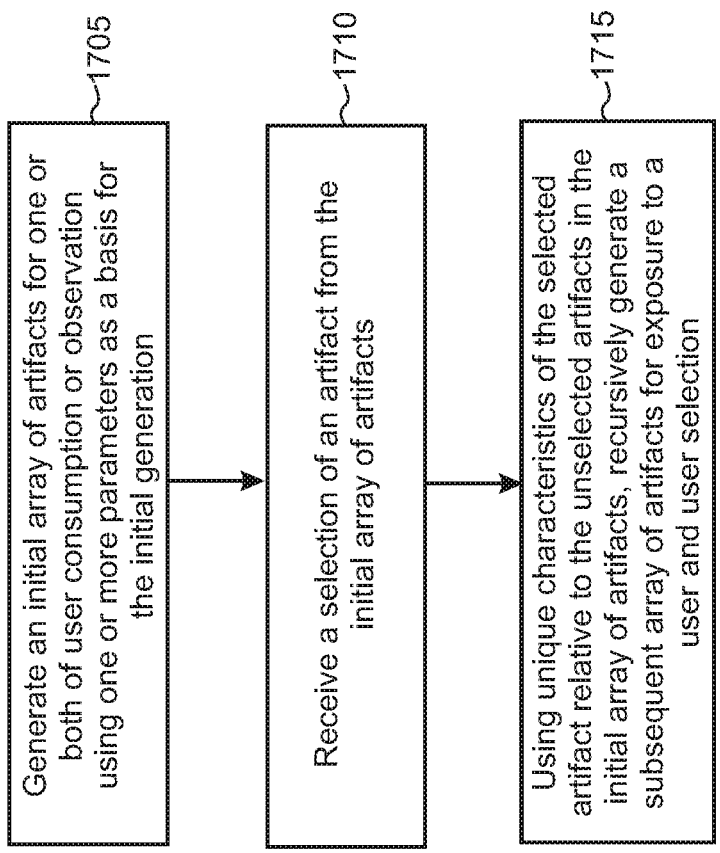

FIG. 17 is a flowchart of an illustrative method 1700 in which a local computing device, remote server, or a combination of the two can perform. In step 1705 an initial array of artifacts is generated for exposure to a user using one or more parameters as a basis for the initial generation. In step 1710 a selection of an artifact from the initial array of artifacts is received. In step 1715 a subsequent array of artifacts is recursively generated for exposure to the user and user selection. The recursive generation may be performed using unique characteristics of the selected artifact relative to the unselected artifacts in the initial array of artifacts.

Figure 18:
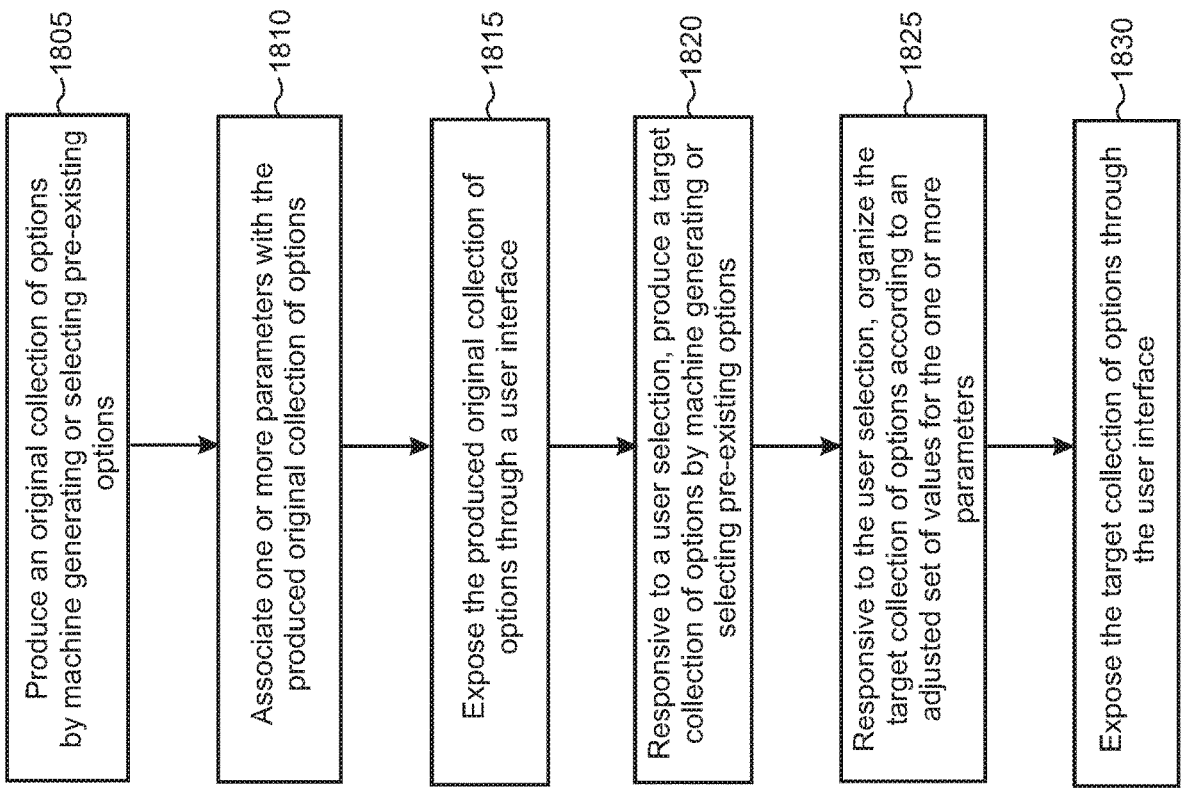

FIG. 18 is a flowchart of an illustrative method 1800 in which a local computing device, remote server, or a combination of the two can perform. In step 1805 an original collection of artifacts is produced by machine generation or selection of pre-existing artifacts. In step 1810 one or more parameters are associated with the produced original collection of artifacts. In step 1815 the produced original collection of artifacts is exposed through a user interface. In step 1820, responsive to a user selection, a target collection of artifacts is produced by machine generation or selection of pre-existing artifacts. In step 1825, responsive to the user selection, the target collection of options is organized according to an adjusted set of values for the one or more parameters. In step 1830, the target collection of artifacts is exposed through the user interface.

Figure 19:
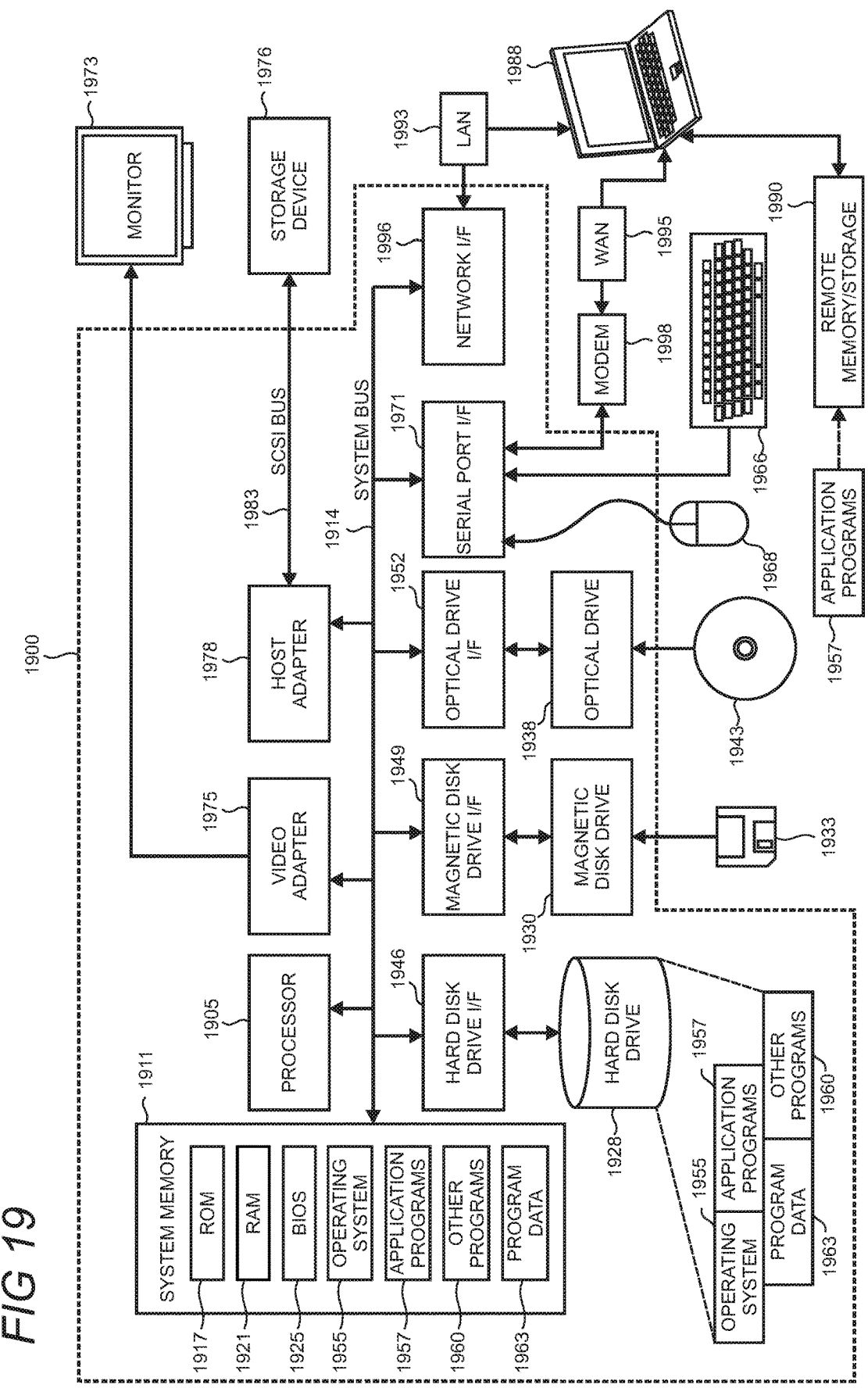
FIG. 19 is a simplified block diagram of an illustrative computing system or server that may be used in part to implement the system for generation of novel artifacts with user-guided discovery and navigation of the creative space.

FIG. 19 is a simplified block diagram of an illustrative computer system 1900 such as a server which may be used to implement the system for generation of novel artifacts with user-guided discovery and navigation of the creative space. Computer system 1900 includes a processor 1905, a system memory 1911, and a system bus 1914 that couples various system components including the system memory 1911 to the processor 1905. The system bus 1914 may be any of several types of bus structures including a memory bus or memory controller, a peripheral bus, or a local bus using any of a variety of bus architectures. The system memory 1911 includes read only memory (ROM) 1917 and random access memory (RAM) 1921. A basic input/output system (BIOS) 1925, containing the basic routines that help to transfer information between elements within the computer system 1900, such as during startup, is stored in ROM 1917. The computer system 1900 may further include a hard disk drive 1928 for reading from and writing to an internally disposed hard disk (not shown), a magnetic disk drive 1930 for reading from or writing to a removable magnetic disk 1933 (e.g., a floppy disk), and an optical disk drive 1938 for reading from or writing to a removable optical disk 1943 such as a CD (compact disc), DVD (digital versatile disc), or other optical media. The hard disk drive 1928, magnetic disk drive 1930, and optical disk drive 1938 are connected to the system bus 1914 by a hard disk drive interface 1946, a magnetic disk drive interface 1949, and an optical drive interface 1952, respectively. The drives and their associated computer-readable storage media provide non-volatile storage of computer-readable instructions, data structures, program modules, and other data for the computer system 1900. Although this illustrative example includes a hard disk, a removable magnetic disk 1933, and a removable optical disk 1943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present system for generation of novel artifacts with user-guided discovery and navigation of the creative space. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are non-transitory and do not include waves, signals, and/or other transitory and/or intangible communication media.

A number of program modules may be stored on the hard disk, magnetic disk, optical disk, ROM 1917, or RAM 1921, including an operating system 1955, one or more application programs 1957, other program modules 1960, and program data 1963. A user may enter commands and information into the computer system 1900 through input devices such as a keyboard 1966 and pointing device 1968 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1905 through a serial port interface 1971 that is coupled to the system bus 1914, but may be connected by other interfaces, such as a parallel port, game port, or universal serial bus (USB). A monitor 1973 or other type of display device is also connected to the system bus 1914 via an interface, such as a video adapter 1975. In addition to the monitor 1973, wearable devices and personal computers can typically include other peripheral output devices (not shown), such as speakers and printers. The illustrative example shown in FIG. 19 also includes a host adapter 1978, a Small Computer System Interface (SCSI) bus 1983, and an external storage device 1976 connected to the SCSI bus 1983.

The computer system 1900 is operable in a networked environment using logical connections to one or more remote computers, such as a remote computer 1988. The remote computer 1988 may be selected as a personal computer, a server, a router, a network PC, a peer device, or other common network node, and typically includes many or all of the elements described above relative to the computer system 1900, although only a single representative remote memory/storage device 1990 is shown in FIG. 19. The logical connections depicted in FIG. 19 include a local area network (LAN) 1993 and a wide area network (WAN) 1995. Such networking environments are often deployed, for example, in offices, enterprise-wide computer networks, intranets, and the Internet.

When used in a LAN networking environment, the computer system 1900 is connected to the local area network 1993 through a network interface or adapter 1996. When used in a WAN networking environment, the computer system 1900 typically includes a broadband modem 1998, network gateway, or other means for establishing communications over the wide area network 1995, such as the Internet. The broadband modem 1998, which may be internal or external, is connected to the system bus 1914 via a serial port interface 1971. In a networked environment, program modules related to the computer system 1900, or portions thereof, may be stored in the remote memory storage device 1990. It is noted that the network connections shown in FIG. 19 are illustrative and other means of establishing a communications link between the computers may be used depending on the specific requirements of an application of the present system for generation of novel artifacts with user-guided discovery and navigation of the creative space.

Figure 20:
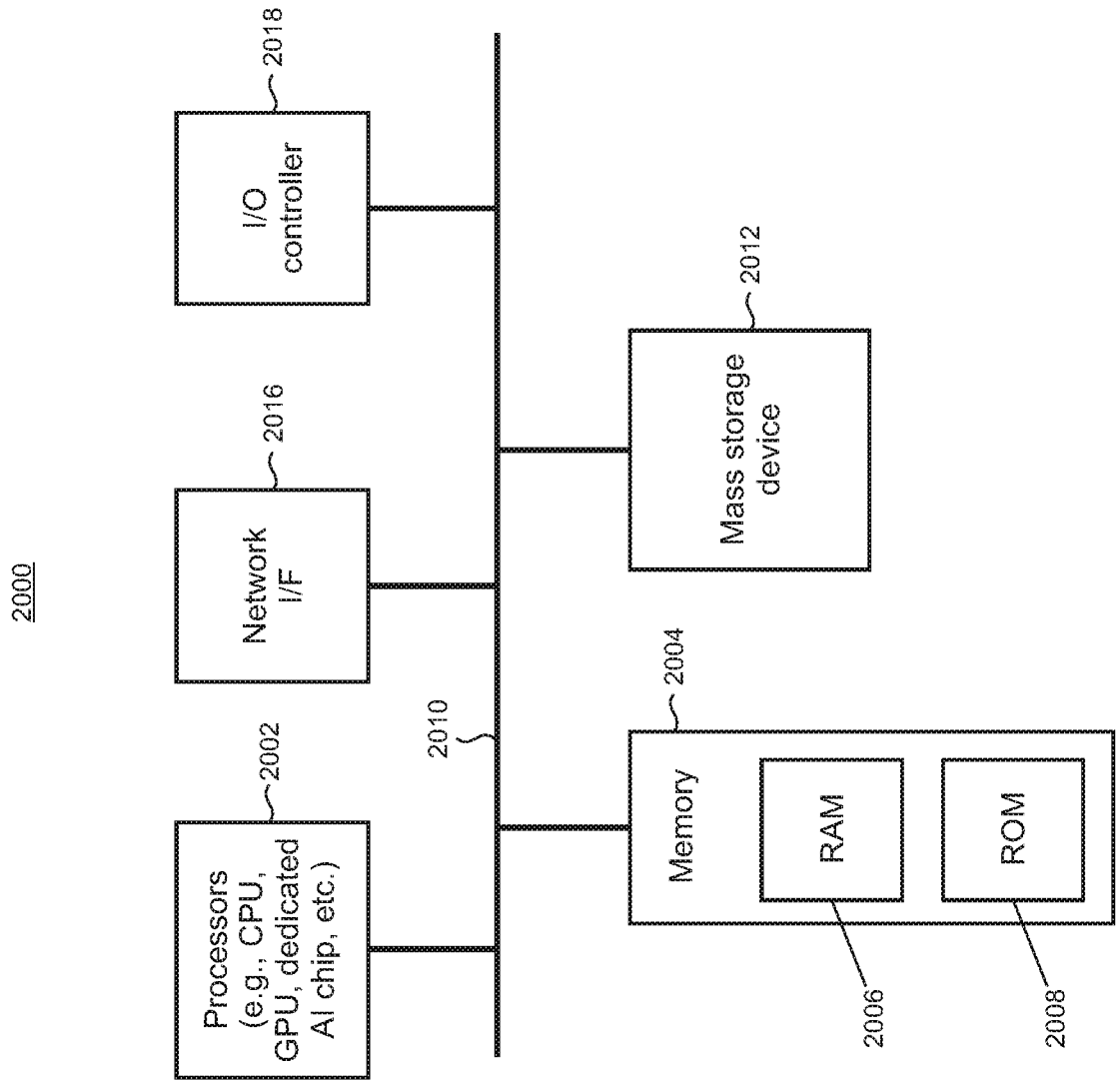
FIG. 20 is a simplified block diagram of an illustrative computer system that may be used in part to implement the system for generation of novel artifacts with user-guided discovery and navigation of the creative space.

FIG. 20 shows an illustrative architecture 2000 for a device capable of executing the various components described herein for generation of novel artifacts with user-guided discovery and navigation of the creative space. The architecture 2000 illustrated in FIG. 20 includes one or more processors 2002 (e.g., central processing unit, dedicated AI chip, graphic processing unit, etc.), a system memory 2004, including RAM (random access memory) 2006 and ROM (read only memory) 2008, and a system bus 2010 that operatively and functionally couples the components in the architecture 2000. A basic input/output system containing the basic routines that help to transfer information between elements within the architecture 2000, such as during startup, is typically stored in the ROM 2008. The architecture 2000 further includes a mass storage device 2012 for storing software code or other computer-executed code that is utilized to implement applications, the file system, and the operating system. The mass storage device 2012 is connected to the processor 2002 through a mass storage controller (not shown) connected to the bus 2010. The mass storage device 2012 and its associated computer-readable storage media provide non-volatile storage for the architecture 2000. Although the description of computer-readable storage media contained herein refers to a mass storage device, such as a hard disk or CD-ROM drive, it may be appreciated by those skilled in the art that computer-readable storage media can be any available storage media that can be accessed by the architecture 2000.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2000.

According to various embodiments, the architecture 2000 may operate in a networked environment using logical connections to remote computers through a network. The architecture 2000 may connect to the network through a network interface unit 2016 connected to the bus 2010. It may be appreciated that the network interface unit 2016 also may be utilized to connect to other types of networks and remote computer systems. The architecture 2000 also may include an input/output controller 2018 for receiving and processing input from a number of other devices, including a keyboard, mouse, touchpad, touchscreen, control devices such as buttons and switches or electronic stylus (not shown in FIG. 20). Similarly, the input/output controller 2018 may provide output to a display screen, user interface, a printer, or other type of output device (also not shown in FIG. 20).

The architecture 2000 may include a voice recognition unit (not shown) to facilitate user interaction with a device supporting the architecture through voice commands, a natural language interface, or through voice interactions with a personal digital assistant (such as the Cortana® personal digital assistant provided by Microsoft Corporation). The architecture 2000 may include a gesture recognition unit (not shown) to facilitate user interaction with a device supporting the architecture through sensed gestures, movements, and/or other sensed inputs.

It may be appreciated that the software components described herein may, when loaded into the processor 2002 and executed, transform the processor 2002 and the overall architecture 2000 from a general-purpose computing system into a special-purpose computing system customized to facilitate the functionality presented herein. The processor 2002 may be constructed from any number of transistors or other discrete circuit elements, which may individually or collectively assume any number of states. More specifically, the processor 2002 may operate as a finite-state machine, in response to executable instructions contained within the software modules disclosed herein. These computer-executable instructions may transform the processor 2002 by specifying how the processor 2002 transitions between states, thereby transforming the transistors or other discrete hardware elements constituting the processor 2002.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2000 in order to store and execute the software components presented herein. It also may be appreciated that the architecture 2000 may include other types of computing devices, including wearable devices, handheld computers, embedded computer systems, smartphones, PDAs, and other types of computing devices known to those skilled in the art. It is also contemplated that the architecture 2000 may not include all of the components shown in FIG. 20, may include other components that are not explicitly shown in FIG. 20, or may utilize an architecture completely different from that shown in FIG. 20.

Figure 21:
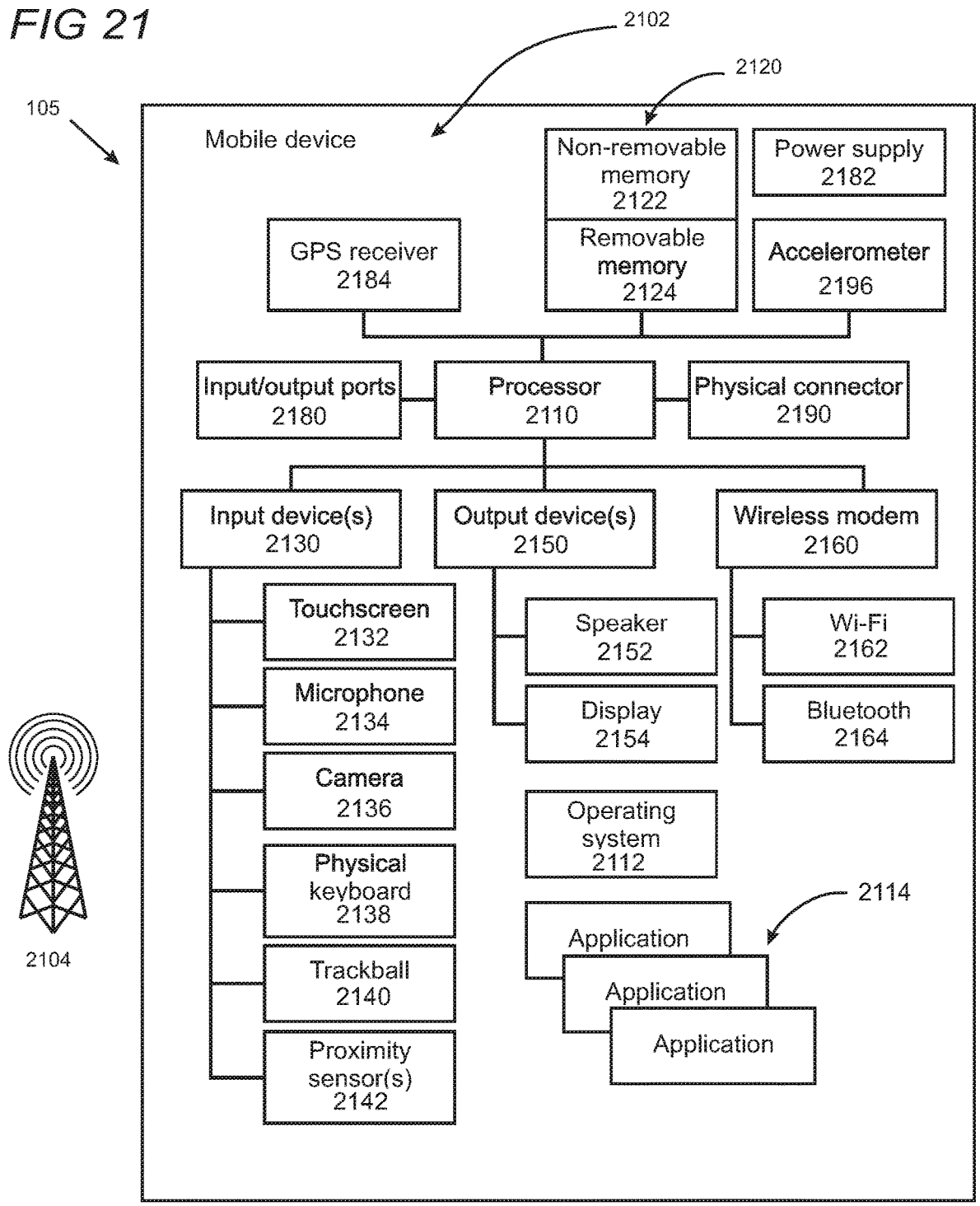
FIG. 21 is a block diagram of an illustrative user computing device such as a mobile phone or smartphone.

FIG. 21 is a functional block diagram of an illustrative computing device 105 such as a mobile phone, smartphone, or other computing device including a variety of optional hardware and software components, shown generally at 2102. Any component 2102 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2104, such as a cellular or satellite network.

The illustrated device 105 can include a controller or processor 2110 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2112 can control the allocation and usage of the components 2102, including power states, above-lock states, and below-lock states, and provides support for one or more application programs 2114. The application programs can include common mobile computing applications (e.g., image-capture applications, e-mail applications, calendars, contact managers, web browsers, messaging applications), or any other computing application.

The illustrated device 105 can include memory 2120. Memory 2120 can include non-removable memory 2122 and/or removable memory 2124. The non-removable memory 2122 can include RAM, ROM, Flash memory, a hard disk, or other well-known memory storage technologies. The removable memory 2124 can include Flash memory or a Subscriber Identity Module (SIM) card, which is well known in GSM (Global System for Mobile communications) systems, or other well-known memory storage technologies, such as "smart cards." The memory 2120 can be used for storing data and/or code for running the operating system 2112 and the application programs 2114. Example data can include web pages, text, images, sound files, video data, or other data sets to be sent to and/or received from one or more network servers or other devices via one or more wired or wireless networks.

The memory 2120 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 105.

The memory 2120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 105 can support one or more input devices 2130—such as a touchscreen 2132; microphone 2134 for implementation of voice input for voice recognition, voice commands, and the like; camera 2136; physical keyboard 2138; trackball 2140; and/or proximity sensor 2142; and one or more output devices 2150—such as a speaker 2152 and one or more displays 2154. Other input devices (not shown) using gesture recognition may also be utilized in some cases. Other possible output devices (not shown) can include piezoelectric or haptic output devices. Some devices can serve more than one input/output function. For example, touchscreen 2132 and display 2154 can be combined into a single input/output device.

A wireless modem 2160 can be coupled to an antenna (not shown) and can support two-way communications between the processor 2110 and external devices, as is well understood in the art. The modem 2160 is shown generically and can include a cellular modem for communicating with the mobile communication network 2104 and/or other radio-based modems (e.g., Bluetooth 2164 or Wi-Fi 2162). The wireless modem 2160 is typically configured for communication with one or more cellular networks, such as a GSM network for data and voice communications within a single cellular network, between cellular networks, or between the device and a public switched telephone network (PSTN).

The device can further include at least one input/output port 2180, a power supply 2182, a satellite navigation system receiver 2184, such as a GPS receiver, an accelerometer 2196, a gyroscope (not shown), and/or a physical connector 2190, which can be a USB port, IEEE 1394 (FireWire) port, and/or an RS-232 port. The illustrated components 2102 are not required or all-inclusive, as any components can be deleted and other components can be added.

Various exemplary embodiments of the present trusted platform module-based prepaid access token for commercial IoT online services are now presented by way of illustration and not as an exhaustive list of all embodiments. An example includes a method to apply user input in machine-learning processes, comprising: responsive to a first user input, generating a first collection of artifacts for display on a user interface; organizing the generated first collection of artifacts using one or more parameters applied to each artifact; presenting the organized first collection of artifacts for display on the user interface; receiving a selection of an artifact of the first collection of artifacts; based on an applied value for each of the one or more parameters to the selected artifact, machine-generating and organizing a second collection of artifacts; and presenting the second collection of artifacts on the user interface.

In another example, machine-generating the second collection of artifacts includes creating new artifacts according to a unique value for each of the one or more parameters associated with the selected artifact. In another example, parameter values apply differently and uniquely to each artifact in a collection of artifacts. In another example, parameter values are different between the first and second collections of artifacts. In another example, a type of the one or more parameters is the same for each artifact when displayed in the collection of artifacts. In another example, each artifact has one or more unique characteristics which are defined by a different parameter value to each artifact using the one or more parameters. In another example, the artifacts are displayed in grid form and respective one or more parameters are labeled about x and y axes of the grid.

In another example, the one or more parameters affect the artifacts based on a distance to the respective axes by which the respective artifacts are located.

A further example includes one or more hardware-based non-transitory computer-readable memory devices storing instructions which, when executed by one or more processors disposed in a computing device, cause the computing device to: generate an initial array of artifacts for exposure to a user using one or more parameters as a basis for the initial generation; receive a selection of an artifact from the initial array of artifacts; and using unique characteristics of the selected artifact relative to unselected artifacts in the initial array of artifacts, recursively generate a subsequent array of artifacts for exposure to the user and user selection, in which the recursive generation includes: creating a subset of an array of artifacts that is narrower relative to the initial array of artifacts based on characteristics associated with the selected artifact; presenting the narrower subset of the array of artifacts for exposure to the user; receiving a subsequent selection of an artifact from the narrower subset of the array of artifacts; and using the received subsequent selection, perform the recursive generation steps or end the recursive generation.

In another example, the generated initial array of artifacts is randomly generated by the computing device. In another example, contextual data of the user or the user's environment is utilized to generate the initial array of artifacts. In another example, the contextual data is input by the user and the parameters are based on the input contextual data. In another example, the parameters are hyperparameters which reduce multi-dimensional concepts into two-dimensional form. In another example, the array of artifacts includes artifacts which represent two distinct ends of a spectrum for the hyperparameters. In another example, the artifacts are types of media including images, videos, and sounds.

A further example includes a computing device configured to navigate a creative space to identify a usable artifact for a user, comprising: a user interface; one or more processors; and one or more hardware-based non-transitory memory devices storing computer-readable instructions which, when executed by the one or more processors cause the computing device to: produce an original collection of options by machine-generation or by selection of pre-existing options, in which the produced original collection of options is a segment of a creative space of options; associate one or more parameters with the produced original collection of options; expose the produced original collection of options through a user interface; responsively to a user selection: produce a target collection of options by machine-generation or by selection of pre-existing options, and organize the target collection of options according to an adjusted set of values for the one or more parameters based on characteristics of the user selection; and expose the target collection of options through the user interface.

In another example, the one or more parameters are human-understandable concepts. In another example, the adjusted set of values for the one or more parameters is narrower relative to a previously applied set of values. In another example, the instructions further cause the computing device to: receive an image; and parse characteristics of the image, in which the produced original collection of options is based on the parsed characteristics of the image. In another example, the associated one or more parameters are selected by the user.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A method to apply user input in machine-learning processes in a multi-dimensional creative space into which newly created artifacts are populated, the multi-dimensional creative space being displayed on a user interface, the method comprising:
   responsive to receiving a first user input to the user interface, using the machine-learning processes to dynamically create new artifacts in a first collection of artifacts for display on the user interface in the multi-dimensional creative space, in which the new artifacts in the first collection are not pre-existing prior to receipt of the first user input;
   automatically computing one or more parameters along respective dimensions of the multi-dimensional creative space that are descriptive of the dynamically created new artifacts in the first collection;
   organizing the dynamically created first collection of new artifacts within the multi-dimensional creative space according to values of the automatically computed one or more parameters describing the new artifacts in the first collection;
   presenting the organized first collection of dynamically created new artifacts for display on the user interface;
   receiving a selection of an artifact from the first collection of dynamically created new artifacts as a second user input to the user interface;
   based on a value for each of the one or more parameters describing the selected artifact, using the machine-learning processes to dynamically create new artifacts and organize the dynamically created new artifacts into a second collection within the multi-dimensional creative space by varying the automatically computed one or more parameters over each dimension of the multi-dimensional creative space, in which the new artifacts in the second collection are not pre-existing prior to receipt of the second user input;
   discontinuing presentation of the first collection of dynamically created new artifacts in the multi-dimensional creative space on the user interface; and
   presenting the second collection of dynamically created new artifacts in the multi-dimensional creative space on the user interface.

2. The method of claim 1, in which the dynamic creating by the machine-learning processes of the second collection of new artifacts includes creating the new artifacts according to a unique value for each of the one or more parameters associated with the selected artifact.

3. The method of claim 2, in which parameter values apply differently and uniquely to each artifact in a collection of new artifacts.

4. The method of claim 3, in which parameter values are different between the first and second collections of new artifacts.

5. The method of claim 1, in which a type of the one or more parameters is the same for each artifact when displayed in the collection of new artifacts.

6. The method of claim 1, in which each artifact has one or more unique characteristics which are defined by a different parameter value to each artifact using the one or more parameters.

7. The method of claim 1, in which the artifacts are displayed in grid form and respective one or more parameters are labeled about x and y axes of the grid.

8. The method of claim 7, in which the one or more parameters affect the artifacts based on a distance to the respective axes by which the respective artifacts are located.

9. One or more hardware-based non-transitory computer-readable memory devices storing instructions which, when executed by one or more processors disposed in a computing device, cause the computing device to:
receive an input from a user of the computing device to trigger dynamic creation of new artifacts using a multi-dimensional array displayed on a user interface of the computing device;
dynamically create new artifacts in a first array for exposure to a user using one or more parameters as a basis for the first array of new artifacts, in which the new artifacts in the first array are not pre-existing prior to receipt of the user input, and in which each of the one or more parameters has variable values that are applicable to each of the dynamically created new artifacts in the first array;
receive a first selection from the user of an artifact from the first array of dynamically created new artifacts; and
using unique characteristics of the first selected artifact relative to unselected artifacts in the first array of dynamically created new artifacts, recursively and dynamically create a second array of new artifacts for exposure to the user, in which the new artifacts in the second array are not pre-existing prior to receipt of the first selection from the user and in which the recursive dynamic creation includes:
dynamically creating new artifacts in the second array that are different from the dynamically created new artifacts in the first array based on parameter values associated with the selected artifact in which parameter values used for new artifact creation are different for each recursive creation along at least one dimension of the multi-dimensional array;
exposing the second array of dynamically created new artifacts to the user;
receiving a second selection by the user of an artifact from the second array of dynamically created new artifacts; and
using the received second selection, performing the recursive dynamic creation to dynamically create new artifacts in an additional array for exposure to the user or end the recursive dynamic creation in which the new artifacts in the additional array are not pre-existing prior to the receipt of the second selection from the user.

10. The one or more hardware-based non-transitory computer-readable memory devices of claim 9, in which the dynamically created first array of new artifacts is randomly dynamically created by the computing device using one or more machine-learning processes.

11. The one or more hardware-based non-transitory computer-readable memory devices of claim 9, in which contextual data of the user or the user's environment is utilized to generate the first array of dynamically created new artifacts.

12. The one or more hardware-based non-transitory computer-readable memory devices of claim 11, in which the contextual data is input by the user and the parameters are based on the input contextual data.

13. The one or more hardware-based non-transitory computer-readable memory devices of claim 9, in which the parameters are hyperparameters which reduce multi-dimensional concepts into two-dimensional form.

14. The one or more hardware-based non-transitory computer-readable memory devices of claim 13, in which the array of dynamically created new artifacts includes artifacts which represent two distinct ends of a spectrum for the hyperparameters.

15. The one or more hardware-based non-transitory computer-readable memory devices of claim 9, in which the artifacts are types of media including images, videos, and sounds.

16. A computing device configured to navigate a multi-dimensional creative space to provide options to identify a usable artifact for a user, comprising:
a user interface;
one or more processors; and
one or more hardware-based non-transitory memory devices storing computer-readable instructions which, when executed by the one or more processors cause the computing device to:
produce an original collection of options that are dynamically created using one or more machine-learning processes, in which the produced original collection of dynamically created options is a segment of the multi-dimensional creative space of options;
automatically compute one or more parameters that are descriptive of the produced original collection of options;
expose the produced original collection of dynamically created options for selection by a user through a user interface on the computing device in which each of the options in the original collection exposed on the user interface are newly created and not-pre-existing;
responsively to a user selection:
produce a target collection of options that are dynamically created using one or more machine-learning processes, and
organize the target collection of dynamically created options by adjusting a set of values for the automatically computed one or more parameters along each dimension of the multi-dimensional creative space based on characteristics of the user selection; and
expose the target collection of dynamically created options through the user interface to replace the original collection of dynamically created options in which each of the options in the target collection exposed on the user interface are newly created and not-pre-existing.

17. The computing device of claim 16, in which the one or more parameters are human-understandable concepts.

18. The computing device of claim 16, in which the adjusted set of values for the one or more parameters is narrower relative to a previously applied set of values.

19. The computing device of claim 16, in which the instructions further cause the computing device to:
receive an image; and
parse characteristics of the image, in which the produced original collection of options is based on the parsed characteristics of the image.

20. The method of claim 1 in which one or more of the dimensions of the multi-dimensional creative space are labelled on the user interface.

* * * * *